US012609840B2

(12) United States Patent
Toinaga et al.

(10) Patent No.: US 12,609,840 B2
(45) Date of Patent: Apr. 21, 2026

(54) CONTROL APPARATUS, CONTROL METHOD, AND COMPUTER-READABLE RECORDING MEDIUM FOR AUTOMATION SYSTEM

(71) Applicant: Yokogawa Electric Corporation, Tokyo (JP)

(72) Inventors: Takeshi Toinaga, Tokyo (JP); Vien Nguyen, Carrollton, TX (US); Andrew Keller, Carrollton, TX (US); Yoshitaka Yoshida, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 163 days.

(21) Appl. No.: 18/378,979

(22) Filed: Oct. 11, 2023

(65) Prior Publication Data
US 2025/0125977 A1 Apr. 17, 2025

(51) Int. Cl.
*H04L 9/32* (2006.01)
(52) U.S. Cl.
CPC ................................. *H04L 9/3268* (2013.01)
(58) Field of Classification Search
None
See application file for complete search history.

(56) References Cited

U.S. PATENT DOCUMENTS 6,826,685 B1 * 11/2004 Douglas ................ H04L 9/3263
713/168
7,624,264 B2 * 11/2009 Aura ..................... H04L 63/123
380/231

8,380,992 B2 * 2/2013 Park .................... H04L 63/0823
713/169
10,277,406 B1 * 4/2019 Veladanda ............ H04L 9/0825
10,411,902 B2 * 9/2019 Kalan .................. H04L 9/3263
10,547,605 B2 1/2020 Ajitomi et al.
2004/0230793 A1 * 11/2004 Estrada ................. H04L 65/403
713/168
2004/0250062 A1 * 12/2004 Douglas .............. H04L 63/0823
726/5
2005/0005097 A1 * 1/2005 Murakawa .......... H04L 63/0823
713/156
2006/0200857 A1 * 9/2006 Yokota ................ H04L 63/0823
726/6
2008/0209208 A1 * 8/2008 Parkinson ........... H04L 63/0428
713/156
2018/0322274 A1 * 11/2018 Lutz ...................... G05B 19/406
2020/0137044 A1 * 4/2020 Shimazawa ........... H04L 63/083
(Continued)

FOREIGN PATENT DOCUMENTS

EP        3993339 A1    5/2022
JP        2022-46438 A    3/2022

OTHER PUBLICATIONS

Extended European Search Report (EESR) dated Nov. 29, 2024 issued in European patent application No. 24205187.8.

*Primary Examiner* — Backhean Tiv
(74) *Attorney, Agent, or Firm* — RANKIN, HILL & CLARK LLP

(57) ABSTRACT

A control apparatus transmits a self-signed certificate to a management server, receives a certificate authority signature certificate generated by the management server according to the self-signed certificate, and executes data communication in the control system that executes control of a system on the basis of the certificate authority signature certificate.

10 Claims, 6 Drawing Sheets

(56)　　　　　　References Cited

U.S. PATENT DOCUMENTS

| | | | | |
|---|---|---|---|---|
| 2020/0274721 | A1* | 8/2020 | Melo ..................... | H04L 9/3265 |
| 2022/0138303 | A1* | 5/2022 | Lutz ..................... | H04L 9/3268 |
| | | | | 726/26 |
| 2022/0147029 | A1* | 5/2022 | Hoernicke ............ | G06Q 50/04 |
| 2024/0243925 | A1* | 7/2024 | Ben-Yehezkel ....... | H04L 9/0866 |
| 2024/0333529 | A1* | 10/2024 | Metzger ............... | H04L 9/3265 |
| 2025/0125977 | A1* | 4/2025 | Toinaga ............. | H04L 63/0823 |

* cited by examiner

| MANAGEMENT SERVER | IP ADDRESS | ... |
|---|---|---|
| MANAGEMENT SERVER GDS001 | XXX.XXX. XXX. 001 | ... |
| MANAGEMENT SERVER GDS002 | YYY.YYY. YYY. 002 | ... |
| ... | ... | ... |

| CONTROL APPARATUS | SELF-SIGNED CERTIFICATE | ... |
|---|---|---|
| CONTROL APPARATUS DCN-A001 | SELF-SIGNED CERTIFICATE #1 | ... |
|  | SELF-SIGNED CERTIFICATE #2 | ... |
|  | ... | ... |

| CONTROL APPARATUS | CERTIFICATE AUTHORITY SIGNATURE CERTIFICATE | ... |
|---|---|---|
| CONTROL APPARATUS DCN-A001 | CERTIFICATE AUTHORITY SIGNATURE CERTIFICATE #1 | ... |
| | CERTIFICATE AUTHORITY SIGNATURE CERTIFICATE #2 | ... |
| | ... | ... |

| DCN VENDOR | CONTROL APPARATUS | IP ADDRESS | ... |
|---|---|---|---|
| A COMPANY | CONTROL APPARATUS DCN-A001 | XXX.XXX. AAA. 001 | ... |
| | ... | ... | ... |
| B COMPANY | CONTROL APPARATUS DCN-B001 | XXX.XXX. BBB. 001 | ... |
| | ... | ... | ... |
| ... | ... | ... | ... |

CONTROL APPARATUS, CONTROL METHOD, AND COMPUTER-READABLE RECORDING MEDIUM FOR AUTOMATION SYSTEM

TECHNICAL FIELD

The present invention relates to an information processing apparatus, an information processing method, and a computer-readable recording medium.

BACKGROUND ART

By introducing an automation system to a plant, processes for manufacturing various products are automated. In a case where a project related to such an automation system is carried out, engineering such as design, construction, and inspection is performed on the basis of design information received from the customer.

CITATION LIST

Patent Literature

Patent Literature 1: JP 2022-046438 A

SUMMARY

Technical Problem

However, conventionally, it is difficult to efficiently perform engineering of an automation system in a plant. For example, conventionally, it is difficult to efficiently construct a safe network topology in a plant automation system.

The present invention has been made in view of the above, and an object thereof is to efficiently perform engineering related to a communication network of an automation system.

Solution to Problem

The present invention provides an information processing apparatus, including a transmission unit that transmits a self-signed certificate to a management server, a reception unit that receives a certificate authority signature certificate generated by the management server according to the self-signed certificate, and an execution unit that executes data communication in a control system that executes control of a system on the basis of the certificate authority signature certificate.

The present invention provides an information processing method including, by a computer transmitting a self-signed certificate to a management server, receiving a certificate authority signature certificate generated by the management server according to the self-signed certificate, and executing data communication in a control system that executes control of a system on the basis of the certificate authority signature certificate.

The present invention provides a computer-readable recording medium that records an information processing program for causing a computer to execute processing of transmitting a self-signed certificate to a management server, receiving a certificate authority signature certificate generated by the management server according to the self-signed certificate, and executing data communication in a control system that executes control of a system on the basis of the certificate authority signature certificate.

BRIEF DESCRIPTION OF DRAWINGS

FIG. 3 is a diagram illustrating an example of a registration information storage unit of the control apparatus according to the embodiment;

FIG. 4 is a diagram illustrating an example of a self-signed certificate storage unit of the control apparatus according to the embodiment;

FIG. 5 is a diagram illustrating an example of a certificate authority signature certificate storage unit of the control apparatus according to the embodiment;

FIG. 6 is a diagram illustrating an example of an individual information storage unit of the management server according to the embodiment;

DESCRIPTION OF EMBODIMENTS

Hereinafter, an information processing apparatus, an information processing method, and a computer-readable recording medium according to an embodiment of the present invention will be described in detail with reference to the drawings. Note that the present invention is not limited to the embodiments described below.

EMBODIMENT

Hereinafter, a configuration and processing of an automation system 100, a configuration and processing of each device of the automation system 100, and a flow of processing of the automation system 100 according to an embodiment will be sequentially described, and finally, the effects of the embodiment will be described.

1. Configuration and Processing of Automation System 100

Figure 1:
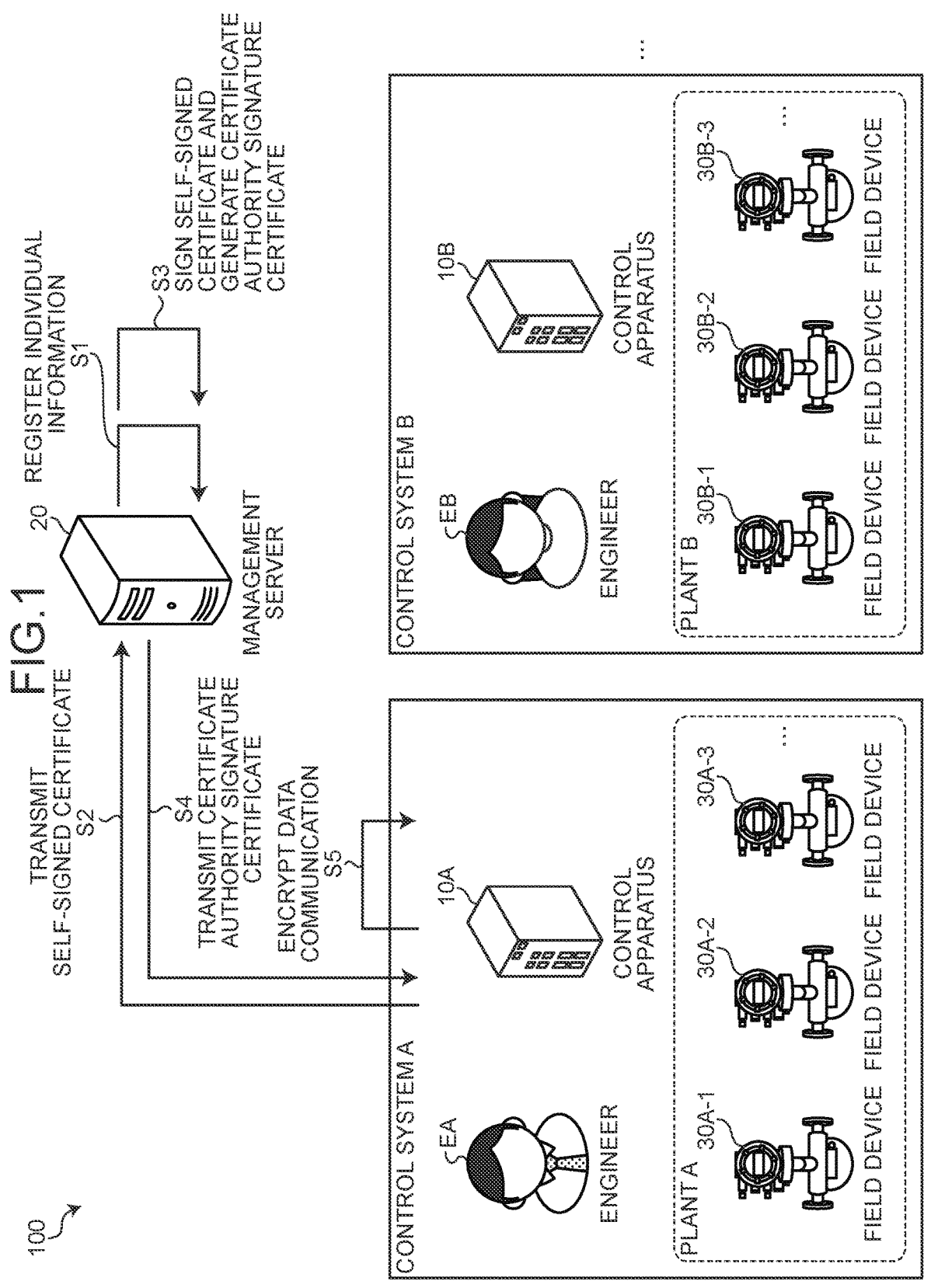
FIG. 1 is a diagram illustrating a configuration example of an automation system according to an embodiment.

A configuration and a process of an automation system 100 according to an embodiment will be described in detail with reference to FIG. 1. FIG. 1 is a diagram illustrating a configuration example of the automation system 100 according to an embodiment. Hereinafter, a configuration example of the entire automation system 100, a processing example of the automation system 100, and effects of the automation system 100 will be described. Note that, in the embodiment, factory production monitoring using plant apparatus which is a device installed in a plant will be described as an example, but the device and the application field are not limited, and the present invention can also be applied to environmental measurement monitoring such as power monitoring, wind power generation, water and sewage monitoring, and river monitoring.

(1-1. Configuration Example of Entire Automation System 100)

The automation system 100 includes control apparatuses 10 (10A, 10B, . . . ) that are information processing apparatuses, a management server 20, and field devices 30 (30A, 30B, . . . ). Here, the control apparatus 10, the management server 20, and the field device 30 are communicably connected in a wired or wireless manner via a predetermined communication network that is not illustrated. Note that various communication networks such as the Internet and a dedicated line can be employed as the predetermined communication network.

(1-1-1. Control Apparatus 10)

The control apparatus 10 is a plant apparatus that controls a plurality of field devices 30 constituting the plant. For example, the control apparatus 10 is implemented by a control controller. Further, the control apparatus 10 is managed by an engineer E (EA, EB, . . . ) who performs maintenance and inspection of a control system of the plant. In the example of FIG. 1, the control apparatus 10A constituting the control system A is managed by the engineer EA. Further, the control apparatus 10B constituting the control system B is managed by the engineer EB.

Here, the control system is a system that controls a process of a plant, and includes a field device 30 and the like controlled by the control apparatus 10 in addition to the control apparatus 10. For example, the control system is implemented by a distributed control node (DCN) that is a control controller, a device group that manages the DCN, and a device group controlled by the DCN. In the example of FIG. 1, a plurality of control systems of a control system A that controls processes of a plant A, a control system B that controls a process of a plant B, . . . are included. In addition, the plant is, for example, a production facility for petroleum/petrochemical conversion, gas, iron/non-iron, chemical, electric power, food, and the like.

(1-1-2. Management Server 20)

The management server 20 is an information processing apparatus that manages at least one control system. For example, the management server 20 is implemented by the Global Discovery Server (GDS) that manages a control system compliant with Open Platform Communications Unified Architecture (OPC UA). Note that the automation system 100 illustrated in FIG. 1 may include a plurality of management servers 20. Furthermore, the management server 20 may be implemented by a cloud environment, an on-premises environment, an edge environment, or the like.

(1-1-3. Field Device 30)

The field device 30 is a plant apparatus constituting a plant. For example, the field device 30 is implemented by measurement devices such as a temperature sensor, a pressure sensor, and a flow rate sensor, and operation devices such as an actuator. In the example of FIG. 1, the field device 30A constituting the plant A includes a field device 30A-1, a field device 30A-2, and field devices 30A-3, . . . . Further, the field device 30B constituting the plant B includes a field device 30B-1, a field device 30B-2, and field devices 30B-3, . . . .

(1-2. Processing Example of Entire Automation System 100)

Processing of the entire automation system 100 as described above will be described. Note that the processing of the following steps S1 to S5 can be executed in a different order. In addition, there may be omitted processing among the processing of the following steps S1 to S5.

(1-2-1. Individual Information Registration Processing)

Firstly, the management server 20 registers individual information (step S1). For example, the management server 20 receives and stores individual information of the control apparatus 10A transmitted by the control apparatus 10A on the basis of self-registration information.

Here, the self-registration information is location information of the management server 20 registered in advance in the control apparatus 10, and is, for example, information including an internet protocol (IP) address, a host name, and the like of the management server 20.

Further, the individual information is identification information and location information of each control apparatus set for each control system of the plant, and is information including, for example, a vendor name of the control system, the control apparatus 10 constituting the control system, a device name, an IP address, a host name, and the like of the control apparatus 10.

(1-2-2. Self-Signed Certificate Transmission Processing)

Secondly, the control apparatus 10 transmits a self-signed certificate $C_s$ to the management server 20 (step S2). For example, the control apparatus 10A generates a self-signed certificate $C_s(A)$, and transmits the self-signed certificate $C_s(A)$ to the management server 20 in which the individual information of the control apparatus 10A is registered. At this time, the control apparatus 10A transmits the self-signed certificate $C_c(A)$ to the management server 20, for example, at the time of initial connection of the control apparatus 10A or at the time of configuration change of the control system A such as replacement or expansion of the control apparatus 10A. Further, for example, the control apparatus 10A transmits the self-signed certificate $C_s(A)$ to the management server 20 one day before the expiration date of a certificate authority signature certificate $C_c(A)$ transmitted from the management server 20 in the past.

At this time, for example, the control apparatus 10A generates a private key $K_s(SA)$ from a public key $K_p(SA)$ of the control apparatus 10A, generates a digest $D_i(A)$ obtained by hashing target identification information i(A) of the control apparatus 10A, generates a self-signature $S_s(A)$, which is an electronic signature of the control apparatus 10A, from the digest $D_i(A)$ using the private key $K_s(SA)$ of the control apparatus 10A, and transmits the self-signed certificate $C_s(A)$ including the target identification information i(A), the self-signature $S_s(A)$, and the public key $K_p(SA)$ to the management server 20.

Here, the target identification information i is information for identifying a target device that generates the self-signed certificate $C_s$, and is, for example, a device name or the like of the control apparatus 10.

(1-2-3. Certificate Authority Signature Certificate Generation Process)

Thirdly, the management server 20 attaches a certificate authority signature $S_c$, which is an electronic signature of a certificate authority (CA), to the self-signed certificate $C_s$, and generates a certificate authority signature certificate $C_c$ (step S3). For example, the management server 20 refers to the individual information held by the management server 20, and in a case where the IP address of the control apparatus 10A that has transmitted the self-signed certificate $C_s(A)$ is registered, generates the certificate authority signature certificate $C_c(A)$ by adding a certificate authority signature $S_c(A)$ to the self-signed certificate $C_s(A)$.

At this time, for example, the management server 20 generates the digest $D_i(A)$ obtained by hashing the target identification information i(A) of the control apparatus 10A, converts the self-signature $S_s(A)$ into a digest $D_i'(A)$ using the public key $K_p(SA)$ included in the self-signed certificate $C_s(A)$, and compares the two digests $D_i(A)$ and $D_i'(A)$ to verify the presence or absence of data falsification of the target identification information i(A). Further, for example, the management server 20 generates a digest $D_k(A)$ obtained by hashing the public key $K_p(SA)$ of the control apparatus 10A, generates the certificate authority signature $S_c(A)$, which is an electronic signature of the management server 20, from the digest $D_k(A)$ using a private key $K_s(C)$ of the management server 20, and generates the certificate authority signature certificate $C_c(A)$ including the public key $K_p(SA)$ and the certificate authority signature $S_c(A)$.

(1-2-4. Certificate Authority Signature Certificate Transmission Process)

Fourthly, the management server 20 transmits the certificate authority signature certificate $C_c$ to the control apparatus 10 (step S4). For example, the management server 20 transmits the generated certificate authority signature certificate $C_c(A)$ to the control apparatus 10A on the basis of the individual information of the control apparatus 10A held by the management server 20. Further, the management server 20 transmits a public key $K_p(C)$ of the management server 20 to the control apparatus 10A.

(1-2-5. Data Communication Encryption Process)

Fifthly, the control apparatus 10 encrypts data communication in the control system (step S5). For example, the control apparatus 10A executes data communication in which data falsification can be verified or data communication in which "spoofing" or the like can be prevented by using encryption information included in the certificate authority signature certificate $C_c(A)$ with the management server 20, another control apparatus 10A' (not illustrated) constituting the control system A, an operator terminal of an operator who manages the control system A, or the like.

Here, the encryption information is information included in the certificate authority signature certificate $C_c(A)$, and is, for example, a public key $K_p(S)$ of the control apparatus 10 used to verify the presence or absence of data falsification of transmission data d(A), the presence or absence of "spoofing" or the like using the certificate authority signature certificate $C_c$ of another person, or the certificate authority signature $S_c$ used to verify the presence or absence of data falsification of the public key $K_p(S)$.

At this time, for example, the control apparatus 10A generates a digest $D_d(A)$ obtained by hashing the transmission data d(A), generates a self-signature $S_d(A)$ from the digest $D_d(A)$ using the private key $K_s(SA)$, and transmits the transmission data d(A), the self-signature $S_d(A)$, and the certificate authority signature certificate $C_c(A)$ to the management server 20, the another control apparatus 10A', the operator terminal, and the like. Further, the control apparatus 10A transmits the public key $K_p(C)$ of the management server 20 to the management server 20, the another control apparatus 10A', the operator terminal, and the like.

On the other hand, the management server 20, the another control apparatus 10A', the operator terminal, and the like generate the digest $D_d(A)$ obtained by hashing the transmission data d(A), convert the self-signature $S_d(A)$ into a digest $D_d'(A)$ using the public key $K_p(SA)$ included in the certificate authority signature certificate $C_c(A)$, and compare the two digests $D_d(A)$ and $D_d'(A)$ to verify the presence or absence of data falsification of the transmission data d(A) or the presence or absence of "spoofing" or the like using the certificate authority signature certificate $C_c$ of another person has occurred. Further, the management server 20, the another control apparatus 10A', the operator terminal, and the like generate the digest $D_k(A)$ obtained by hashing the public key $K_p(SA)$ included in the certificate authority signature certificate $C_c(A)$, convert the certificate authority signature $S_c(A)$ into a digest $D_k'(A)$ using the public key $K_p(C)$ of the management server 20, and compare the two digests $D_k(A)$ and $D_k'(A)$ to verify the presence or absence of data falsification of the public key $K_p(SA)$.

(1-3. Effect of Automation System 100)

Hereinafter, problems of an automation system 100P according to the reference technology will be described, and then effects of the automation system 100 will be described.

(1-3-1. Problems with Automation System 100P)

In the automation system 100P, data communication is executed by exchanging the self-signed certificate $C_s$ between plant apparatuses. Further, the automation system 100P requests issuance of the certificate authority signature certificate $C_c$ via a certificate management client device, and executes data communication by exchanging the issued certificate authority signature certificate $C_c$.

However, the data communication executed by exchanging the self-signed certificate $C_s$ is less secure. Further, the issuance of the certificate authority signature certificate $C_c$ via the certificate management client device takes more time and effort as the number of plant apparatuses of the control system increases. For example, in the automation system 100P, when the plant apparatus of the control system is disconnected from the connection of the communication network, the engineer E needs to confirm whether or not the certificate authority signature certificate $C_c$ is issued to the plant apparatus. Further, in the automation system 100P, if the engineer E does not always check the expiration date of the certificate authority signature certificate $C_c$ issued to the plant apparatus, the communication network may be disconnected.

(1-3-2. Overview of Automation System 100)

In the automation system 100, the following processing is executed. Firstly, the management server 20 registers individual information of each control apparatus 10. Secondly, the control apparatus 10 transmits the self-signed certificate $C_s$ to the management server 20. Thirdly, the management server 20 adds the certificate authority signature $S_c$ to the self-signed certificate $C_s$ and generates the certificate authority signature certificate $C_c$. Fourthly, the management server 20 transmits the certificate authority signature certificate $C_c$ to the control apparatus 10. Fifthly, the control apparatus 10 encrypts data communication in the control system using the certificate authority signature certificate $C_c$.

At this time, in the automation system 100, the control apparatus 10 transmits the self-signed certificate $C_s$ to the management server 20 at the timing of first connection of the control apparatus 10, configuration change of the control system such as replacement or expansion of the control apparatus 10, a predetermined time before the expiration date of the certificate authority signature certificate $C_c$, or the like.

(1-3-3. Effects of Automation System 100)

The automation system 100 can automatically determine whether or not the control apparatus 10 itself already holds the certificate authority signature certificate $C_c$ at the time of network participation. For example, in the automation system 100, in a case where the new control apparatus 10 is installed in the control system, the control apparatus 10 included in the control system can check a digital certificate of the control apparatus 10, perform a procedure of issuing the certificate authority signature certificate $C_c$, and replace the issued certificate authority signature certificate $C_c$. Thus, in the automation system 100, when the control apparatus 10 is once separated from the network and a change of place or the like is carried out, the network can be automatically constructed even if the engineer E managing the control apparatus 10 is changed. Further, the automation system 100 can also check the expiration date of the certificate authority signature certificate $C_c$ and automatically perform update, for example, one day before the expiration date.

That is, the automation system 100 has the following effects. Firstly, the automation system 100 can automate the electronic signature process to digital certificates for data communication in a control system compliant with standards such as OPC UA, Secondly, the automation system 100 can reduce engineering work for managing digital certificates and creating a secure network. Thirdly, the automation system 100 can prevent data communication of a plant apparatus holding an invalid digital certificate, that is, a digital certificate not electronically signed by the management server 20.

As described above, the automation system 100 can efficiently perform engineering on a communication network of the automation system.

2. Configuration and Processing of Each Device of Automation System 100

Figure 2:
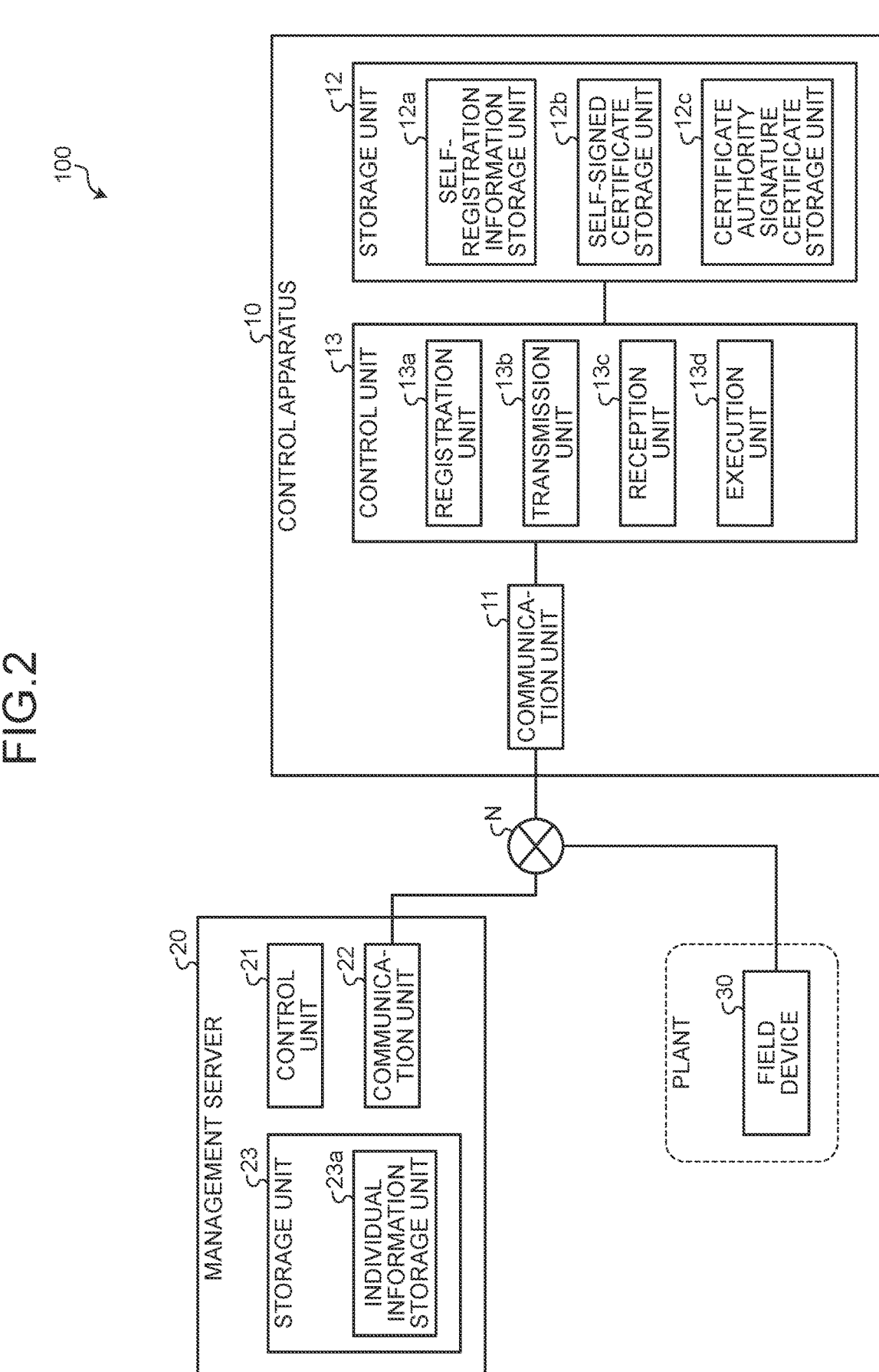
FIG. 2 is a block diagram illustrating a configuration example of each apparatus of the automation system according to the embodiment.

The configuration and processing of each device included in the automation system 100 illustrated in FIG. 1 will be described with reference to FIG. 2. FIG. 2 is a block diagram illustrating a configuration example of each device of the automation system 100 according to the embodiment. Hereinafter, a configuration example and a processing example of the control apparatus 10, a configuration example and a processing example of the management server 20, and a configuration example and a processing example of the field device 30 will be described in detail after a configuration example of the entire automation system 100 according to the embodiment is described.

(2-1. Configuration Example of Entire Automation System 100)

A configuration example of the entire automation system 100 illustrated in FIG. 1 will be described with reference to FIG. 2. As illustrated in FIG. 2, the automation system 100 includes the control apparatus 10, the management server 20, and the field device 30. Further, the control apparatus 10, the management server 20, and the field device 30 are communicably connected by a communication network N implemented by the Internet, a dedicated line, or the like.

At this time, the management server 20 may be implemented by a cloud environment, an on-premises environment, an edge environment, or the like. Further, the control apparatus 10 and the field device 30 constitute a control system that controls a system. Here, the system is, for example, a plant. Further, the control system executes control of the plant, for example. Furthermore, the field device 30 is installed in a plant.

Further, the control system or the control apparatus 10 may conform to, for example, Open Process Automation (OPA), Module Type Package (MTP), or NAMUR Open Architecture (NOA) which is a standard.

In addition, the control system or the control apparatus 10 may conform to, for example, OPC UA which is a standard.

(2-2. Configuration Example and Processing Example of Control Apparatus 10)

A configuration example and a processing example of the control apparatus 10 will be described with reference to FIG. 2. The control apparatus 10 is a device that controls a plurality of devices constituting the control system, and includes a communication unit 11, a storage unit 12, and a control unit 13.

(2-2-1. Communication Unit 11)

The communication unit 11 manages data communication with other devices. For example, the communication unit 11 performs data communication with each communication device via a router or the like. Further, the communication unit 11 can perform data communication with a terminal of an operator who is not illustrated.

(2-2-2. Storage Unit 12)

The storage unit 12 stores various types of information referred to when the control unit 13 operates and various types of information acquired when the control unit 13 operates. The storage unit 12 includes a self-registration information storage unit 12a, a self-signed certificate storage unit 12b, and a certificate authority signature certificate storage unit 12c. Here, the storage unit 12 can be implemented by, for example, a semiconductor memory element such as a random access memory (RAM) or a flash memory, a storage device such as a hard disk or an optical disk, or the like. Note that, in the example of FIG. 2, the storage unit 12 is installed inside the control apparatus 10, but may be installed outside the control apparatus 10, or a plurality of storage units may be installed.

(2-2-2-1. Self-Registration Information Storage Unit 12a)

The self-registration information storage unit 12a stores self-registration information. For example, the self-registration information storage unit 12a stores self-registration information including an IP address or a host name for specifying the location of the management server 20 input by the engineer E who manages the control system. Here, an example of data stored in the self-registration information storage unit 12a will be described with reference to FIG. 3. FIG. 3 is a diagram illustrating an example of the self-registration information storage unit 12a of the control apparatus 10 according to the embodiment. In the example of FIG. 3, the self-registration information storage unit 12a includes items such as "management server" and "IP address".

The "management server" indicates identification information for identifying the management server 20 that manages the control system, and is, for example, an identification number or an identification symbol of the management server 20. The "IP address" indicates identification information for identifying the management server 20 on the communication network, and is, for example, an identification number or an identification symbol assigned to the management server 20.

That is, FIG. 3 illustrates an example in which data of {management server: "management server GDS001", IP address "XXX.XXX.XXX.001", . . . }, {management server: "management server GDS002", IP address "YYY.YYY.YYY.002", . . . }, and the like are stored in the self-registration information storage unit 12a. Note that, in the example of FIG. 3, the "management server GDS001" executes processing as a working device that manages a plurality of control apparatuses 10, and the "management server GDS002" executes processing as a backup device that is a backup of the working device.

(2-2-2-2. Self-Signed Certificate Storage Unit 12b)

The self-signed certificate storage unit 12b stores the self-signed certificate $C_s$. For example, the self-signed certificate storage unit 12b stores a self-signed certificate $C_s$ generated by a transmission unit 13b of the control unit 13 to be described later. Here, an example of data stored in the self-signed certificate storage unit 12b will be described with reference to FIG. 4. FIG. 4 is a diagram illustrating an example of the self-signed certificate storage unit 12b of the control apparatus 10 according to the embodiment. In the example of FIG. 4, the self-signed certificate storage unit 12*b* includes items such as "control apparatus" and "self-signed certificate".

The "control apparatus" indicates identification information for identifying the control apparatus 10 constituting the control system, and is, for example, an identification number or an identification symbol of the control apparatus 10. The "self-signed certificate" is a digital certificate generated by the control apparatus 10, and is, for example, a certificate obtained by electronically signing the public key $K_p(S)$ of the control apparatus 10 with a private key $K_p(S)$ of the control apparatus 10 that forms a pair.

That is, FIG. 4 illustrates an example in which data and the like that are the "self-signed certificate #1", the "self-signed certificate #2", . . . , and the like are stored in the self-signed certificate storage unit 12*b* for the control apparatus 10A identified by "control apparatus DCN-A001".

(2-2-2-3. Certificate Authority Signature Certificate Storage Unit 12*c*)

The certificate authority signature certificate storage unit 12*c* stores the certificate authority signature certificate $C_c$. For example, the certificate authority signature certificate storage unit 12*c* stores the certificate authority signature certificate $C_c$ generated by the management server 20 having a function of a certificate authority and received by a reception unit 13*c* of the control unit 13 to be described later. Here, an example of data stored in the certificate authority signature certificate storage unit 12*c* will be described with reference to FIG. 5. FIG. 5 is a diagram illustrating an example of the certificate authority signature certificate storage unit 12*c* of the control apparatus 10 according to the embodiment. In the example of FIG. 5, the certificate authority signature certificate storage unit 12*c* includes items such as "control apparatus" and "certificate authority signature certificate".

The "control apparatus" indicates identification information for identifying the control apparatus 10 constituting the control system, and is, for example, an identification number or an identification symbol of the control apparatus 10. The "certificate authority signature certificate" is a digital certificate generated by the management server 20, and is, for example, a certificate obtained by electronically signing the public key $K_p(S)$ of the control apparatus 10 included in the self-signed certificate $C_s$ transmitted from the control apparatus 10 with the private key $K_s(C)$ of the management server 20.

That is, FIG. 4 illustrates an example in which data and the like that are "certificate authority signature certificate #1", "certificate authority signature certificate #2", . . . , and the like are stored in the certificate authority signature certificate storage unit 12*c* for the control apparatus 10A identified by the "control apparatus DCN-A001".

(2-2-3. Control Unit 13)

The control unit 13 controls the entire control apparatus 10. The control unit 13 includes a registration unit 13*a*, the transmission unit 13*b*, the reception unit 13*c*, and an execution unit 13*d*. Here, the control unit 13 can be implemented by, for example, an electronic circuit such as a central processing unit (CPU) or a micro processing unit (MPU), or an integrated circuit such as an application specific integrated circuit (ASIC) or a field programmable gate array (FPGA). Further, the control unit 13 is implemented via an application having an interface conforming to the OPA standard which is a standard organization.

(2-2-3-1. Registration Unit 13*a*)

The registration unit 13*a* registers various types of information. For example, the registration unit 13*a* registers the individual information including the IP address or the host name of the control apparatus 10 in the management server 20 using the IP address or the host name of the management server 20.

Describing a specific example, the registration unit 13*a* refers to the IP address "XXX.XXX.XXX.001" of the management server 20A that is the working device from the {management server: "management server GDS001", IP address "XXX.XXX.XXX.001", . . . } that is the self-registration information input by the engineer EA who manages the control system A and stored in the self-registration information storage unit 12*a*, transmits the individual information including the identification information "control apparatus DCN-A001" of the control apparatus 10A, the IP address "XXX.XXX.AAA.001" of the control apparatus 10A, and the like to the management server 20A, and causes an individual information storage unit 23*a* of the management server 20A to store it.

On the other hand, when the access to the management server 20A that is the working device is disabled, the registration unit 13*a* refers to the IP address "YYY.YYY.YYY.002" of the management server 20B that is the backup device from the {management server: "management server GDS002", IP address: "YYY.YYY.YYY.002", . . . } that is the self-registration information, transmits the individual information of the control apparatus 10A to the management server 20B, and causes the individual information storage unit 23*a* of the management server 20B to store it. Similarly, when the registration unit 13*a* cannot access the management server 20B, it is possible to refer to the IP addresses in the order of the list of the management servers 20 stored in the self-registration information storage unit 12*a* and transmit the individual information of the control apparatus 10A.

(2-2-3-2. Transmission Unit 13*b*)

The transmission unit 13*b* transmits various types of information. For example, the transmission unit 13*b* transmits the self-signed certificate $C_s$ to the management server 20. Further, the transmission unit 13*b* transmits the self-signed certificate $C_s$ to the management server 20 using the registered IP address or host name of the management server 20.

Describing a specific example, the transmission unit 13*b* generates the private key $K_s(S)$ from the public key $K_p(S)$ of the control apparatus 10, generates a digest $D_i$ obtained by hashing the target identification information i of the control apparatus 10, generates the self-signature $S_s$, which is an electronic signature of the control apparatus 10, from the digest $D_i$ using the private key $K_s(S)$ of the control apparatus 10, and generates the self-signed certificate $C_s$ including the target identification information i, the self-signature $S_s$, and the public key $K_p(S)$. Further, the transmission unit 13*b* refers to the IP address "XXX.XXX.XXX.001" of the management server 20 that is the self-registration information stored in the self-registration information storage unit 12*a*, and transmits the generated self-signed certificate $C_s$ to the management server 20.

The transmission unit 13*b* transmits, when the control apparatus 10 is connected to the communication network including the management server 20 for the first time or when the control apparatus 10 is connected to the communication network including the management server 20 after a system configuration is changed, the self-signed certificate $C_s$ to the management server 20. Further, the transmission unit 13*b* transmits the self-signed certificate $C_s$ to the management server 20 a predetermined time before the expiration date of the certificate authority signature certificate $C_c$.

Describing a specific example, the transmission unit 13b generates the self-signed certificate $C_s$ at the time of the first connection of the control apparatus 10, and transmits the generated self-signed certificate $C_s$ to the management server 20. Further, the transmission unit 13b requests the digital certificate held by the control apparatus 10 to the control apparatus 10 at the time of configuration change of the control system such as replacement or expansion of the control apparatus 10, generates the self-signed certificate $C_s$ when the digital certificate held by the control apparatus 10 is not a valid certificate authority signature certificate $C_c$, and transmits the generated self-signed certificate $C_s$ to the management server 20. Further, the transmission unit 13b refers to the history information of the certificate authority signature certificate $C_c$ transmitted to the control apparatus 10, generates the self-signed certificate $C_s$ one day before the expiration date of the certificate authority signature certificate $C_c$, and transmits the generated self-signed certificate $C_s$ to the management server 20.

(2-2-3-3. Reception Unit 13c)

The reception unit 13c receives various types of information. For example, the reception unit 13c receives the certificate authority signature certificate $C_c$ generated by the management server 20 according to the self-signed certificate $C_s$. At this time, the reception unit 13c receives the certificate authority signature certificate $C_c$ generated by the management server 20 adding the certificate authority signature $S_c$ to the self-signed certificate $C_s$. Further, the reception unit 13c receives the certificate authority signature certificate $C_c$ generated by the management server 20 in a case where the individual information including the IP address or the host name of the control apparatus 10 is registered.

Describing a specific example, the reception unit 13c receives, from the management server 20, the public key $K_p(S)$ of the control apparatus 10 and the certificate authority signature certificate $C_c$ including the certificate authority signature $S_c$ that is an electronic signature generated by the management server 20 and is generated from the digest $D_k$ of the public key $K_p(S)$ by using the private key $K_s(C)$ of the management server 20. Further, the reception unit 13c receives the public key $K_p(C)$ of the management server 20 from the management server 20. Note that the reception unit 13c can also receive the public key $K_p(C)$ of the management server 20 from a management server 20' different from the management server 20.

(2-2-3-4. Execution Unit 13d)

The execution unit 13d executes data communication. For example, the execution unit 13d executes data communication in the control system that controls the system on the basis of the certificate authority signature certificate $C_c$. Further, the execution unit 13d executes data communication in which falsification can be verified or validity of the certificate authority signature certificate $C_c$ can be verified in the control system by using the encryption information included in the certificate authority signature certificate $C_c$. Here, the falsification is data falsification of transmission data d, data falsification of the public key $K_p(S)$, or the like. Further, the validity of the certificate authority signature certificate $C_c$ is validity related to "spoofing" using the certificate authority signature certificate $C_c$ of another person and an expiration date of the certificate authority signature certificate $C_c$.

Describing a specific example, the execution unit 13d generates a digest $D_d$ obtained by hashing the transmission data d, generates a self-signature $S_d$ from the digest $D_d$ using the private key $K_s(S)$ of the control apparatus 10, and transmits the transmission data d, the self-signature $S_d$, and the certificate authority signature certificate $C_c$ to the management server 20, another control apparatus 10', the operator terminal, and the like. Further, the execution unit 13d transmits the public key $K_p(C)$ of the management server 20 to the management server 20, the another control apparatus 10', the operator terminal, and the like.

On the other hand, the execution unit 13d receives the transmission data d, the self-signature $S_d$, and the certificate authority signature certificate $C_c$ transmitted from the management server 20, the another control apparatus 10', the operator terminal, and the like. Further, the execution unit 13d receives the public key $K_p(C)$ of the management server 20 transmitted from the management server 20, the another control apparatus 10', the operator terminal, and the like. At this time, the execution unit 13d generates the digest $D_d$ obtained by hashing the transmission data d, converts the self-signature $S_d$ into a digest $D_d'$ using the public key $K_p(S)$ included in the certificate authority signature certificate $C_c$, and compares the two digests $D_d$ and $D_d'$ to verify the presence or absence of data falsification of the transmission data d, the presence or absence of "spoofing" using the certificate authority signature certificate $C_c$ of another person, or the like. Further, the execution unit 13d generates the digest $D_k$ obtained by hashing the public key $K_p(S)$ included in the certificate authority signature certificate $C_c$, converts the certificate authority signature $S_c$ into the digest $D_k'$ using the public key $K_p(C)$ of the management server 20, and compares the two digests $D_k$ and $D_k'$ to verify the presence or absence of data falsification of the public key $K_p(S)$.

Further, the execution unit 13d collects measurement values from the field devices 30 constituting the control system. In addition, the execution unit 13d may calculate a calculated value from the measurement values collected from the field device 30. Further, the execution unit 13d controls the field device 30 by transmitting a control signal.

(2-3. Configuration Example and Processing Example of Management Server 20)

A configuration example and a processing example of the management server 20 will be described with reference to FIG. 2. The management server 20 is an information processing apparatus, and includes a control unit 21, a communication unit 22, and a storage unit 23. Note that the management server 20 may include an input unit (for example, a keyboard, a mouse, or the like) that receives various operations from an administrator of the management server 20, and a display unit (for example, a liquid crystal display or the like) for displaying various types of information.

(2-3-1. Control Unit 21)

The control unit 21 controls the entire management server 20. Here, the control unit 21 can be implemented by, for example, an electronic circuit such as a CPU or an MPU, or an integrated circuit such as an ASIC or an FPGA.

The control unit 21 receives individual information. For example, the control unit 21 receives individual information including the IP address or the host name of the control apparatus 10 transmitted from the control apparatus 10, and stores the individual information in the storage unit 23.

Describing a specific example, the control unit 21 receives the individual information including the identification information "control apparatus DCN-A001" of the control apparatus 10A, the IP address "XXX.XXX.AAA.001" of the control apparatus 10A, and the like transmitted from the control apparatus 10A, and stores the individual information in the individual information storage unit 23*a* of the storage unit 23 to be described later.

The control unit 21 receives the self-signed certificate. Furthermore, for example, the control unit 21 receives the self-signed certificate transmitted from the control apparatus 10 using the IP address or host name of the management server 20.

Describing a specific example, the control unit 21 receives the self-signed certificate $C_s(A)$ including the target identification information $i(A)$, the self-signature $S_s(A)$, and the public key $K_p(SA)$ of the control apparatus 10A transmitted from the control apparatus 10A.

The control unit 21 generates a certificate authority signature certificate. For example, the control unit 21 refers to the individual information held by the management server 20 and, in a case where the IP address of the control apparatus 10A that has transmitted the self-signed certificate $C_s(A)$ is registered, generates the certificate authority signature certificate $C_c(A)$ by adding the certificate authority signature $S_c(A)$ to the self-signed certificate $C_s(A)$.

Describing a specific example, the control unit 21 generates the digest $D_i(A)$ obtained by hashing the target identification information $i(A)$ of the control apparatus 10A, converts the self-signature $S_s(A)$ into the digest $D_i'(A)$ using the public key $K_p(SA)$ included in the self-signed certificate $C_s(A)$, and compares the two digests $D_i(A)$ and $D_i'(A)$ to verify whether the presence or absence of data falsification of the target identification information $i(A)$. Furthermore, the control unit 21 generates the digest $D_k(A)$ obtained by hashing the public key $K_p(SA)$ of the control apparatus 10A, generates the certificate authority signature $S_c(A)$, which is an electronic signature of the management server 20, from the digest $D_k(A)$ using the private key $K_s(C)$ of the management server 20, and generates the certificate authority signature certificate $C_c(A)$ including the public key $K_p(SA)$ and the certificate authority signature $S_c(A)$.

The control unit 21 transmits the certificate authority signature certificate $C_c$. For example, the control unit 21 transmits the generated certificate authority signature certificate $C_c(A)$ to the control apparatus 10A on the basis of the individual information of the control apparatus 10A held by the management server 20. Further, the control unit 21 transmits the public key $K_p(C)$ of the management server 20 to the control apparatus 10A.

Describing a specific example, the control unit 21 transmits the certificate authority signature certificate $C_c(A)$ including the public key $K_p(SA)$ and the certificate authority signature $S_c(A)$ to the control apparatus 10A on the basis of the IP address "XXX.XXX.AAA.001" of the control apparatus 10A, and transmits the public key $K_p(C)$ of the management server 20 to the control apparatus 10A.

(2-3-2. Communication Unit 22)

The communication unit 22 manages data communication with other devices. For example, the communication unit 22 performs data communication with each communication device via a router or the like. Furthermore, the communication unit 22 can perform data communication with a terminal of an operator who is not illustrated.

(2-3-3. Storage Unit 23)

The storage unit 23 stores various types of information referred to when the control unit 21 operates and various types of information acquired when the control unit 21 operates. The storage unit 23 includes the individual information storage unit 23*a*. Here, the storage unit 23 can be implemented by, for example, a semiconductor memory element such as a RAM or a flash memory, or a storage device such as a hard disk or an optical disk. Note that, in the example of FIG. 2, the storage unit 23 is installed inside the management server 20 but may be installed outside the management server 20, or a plurality of storage units may be installed.

(2-3-3-1. Individual Information Storage Unit 23*a*)

The individual information storage unit 23*a* stores individual information. For example, the individual information storage unit 23*a* stores individual information including an IP address or a host name for specifying the location of the control apparatus 10 registered by the control apparatus 10. Here, an example of data stored in the individual information storage unit 23*a* will be described with reference to FIG. 6. FIG. 6 is a diagram illustrating an example of the individual information storage unit 23*a* of the management server 20 according to the embodiment. In the example of FIG. 6, the individual information storage unit 23*a* includes items such as "DCN vendor", "control apparatus", and "IP address".

The "DCN vendor" indicates identification information for identifying a system vendor that provides the control system, and is, for example, a company name or the like of the system vendor. The "control apparatus" indicates identification information for identifying the control apparatus 10 constituting the control system, and is, for example, an identification number or an identification symbol of the control apparatus 10, The "IP address" indicates identification information for identifying the control apparatus 10 on the communication network, and is, for example, an identification number or an identification symbol assigned to the control apparatus 10.

That is, FIG. 6 illustrates an example in which data of {control apparatus: "control apparatus DCN-A001", IP address "XXX.XXX.AAA.001", . . . } for the DCN vendor identified by "A company" and data of {control apparatus: "control apparatus DCN-B001", IP address "XXX.XXX.BBB.001", . . . } for the DCN vendor identified by "B company" are stored in the individual information storage unit 23*a*.

(2-4. Field Device 30)

The field device 30 is a measurement device such as a sensor device constituting the control system, and measures a sensor value and a process value. At this time, the field device 30 transmits the measured sensor value and process value as measurement values to the control apparatus 10 constituting the control system. Further, the field device 30 is an operation device such as an actuator constituting the control system, and executes process control such as opening and closing of a valve according to a control signal received from the control apparatus 10 constituting the control system.

3. Flow of Each Processing of Automation System 100

Figure 7:
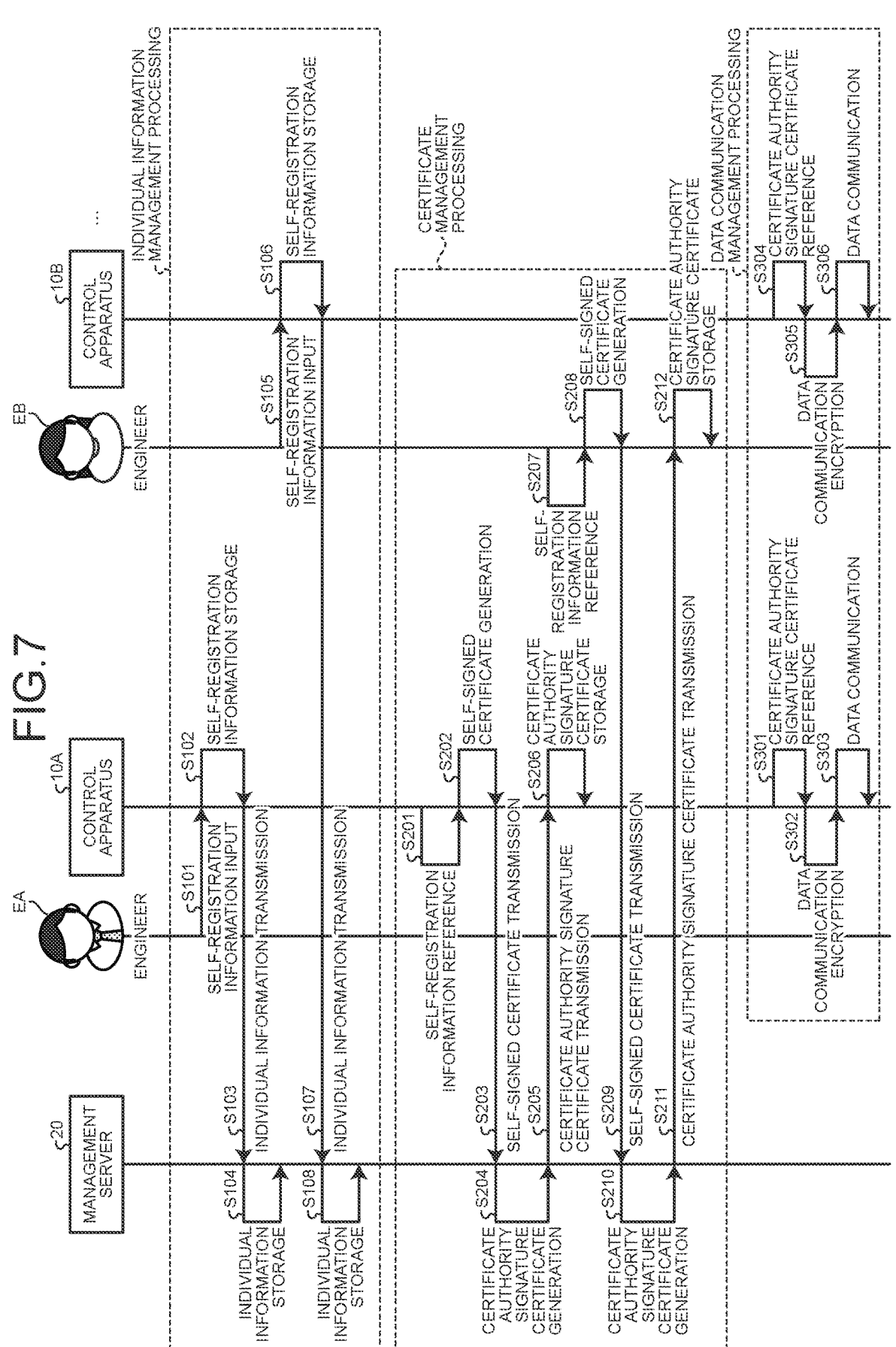
FIG. 7 is a sequence diagram illustrating an example of a flow of the entire automation system according to the embodiment.

A flow of processing of the entire automation system 100 according to the embodiment will be described with reference to FIG. 7. FIG. 7 is a sequence diagram illustrating an example of a flow of the entire automation system 100 according to the embodiment. Hereinafter, individual information management processing, certificate management processing, and data communication management processing will be described in this order.

(3-1. Flow of Individual Information Management Processing)

Hereinafter, a flow of the individual information management processing of the automation system 100 according to the embodiment will be described. Note that the processing in steps S101 to $108 below can be executed in a different order. In addition, there may be omitted processing among the processing of the following steps S101 to S108.

Firstly, the engineer EA executes self-registration information input processing (step S101), For example, the engineer EA inputs self-registration information including the IP address of the management server 20 that manages the control system A to the control apparatus 10A. Secondly, the control apparatus 10A executes self-registration information storage processing (step S102). For example, the control apparatus 10A stores the self-registration information including the IP address of the management server 20 in the self-registration information storage unit 12a of the control apparatus 10A. Thirdly, the control apparatus 10A executes individual information transmission processing (step S103). For example, the control apparatus 10A refers to the IP address of the management server 20, and transmits the individual information of the control apparatus 10A including the target identification information i(A) and the IP address of the control apparatus 10A to the management server 20. Fourthly, the management server 20 executes individual information storage processing (step S104). For example, the management server 20 receives the individual information of the control apparatus 10A transmitted from the control apparatus 10A, and stores the individual information in the individual information storage unit 23a of the control apparatus 10A.

Fifthly, the engineer EB executes self-registration information input processing (step S105). For example, the engineer EB inputs self-registration information including the IP address of the management server 20 that manages the control system B to the control apparatus 10B. Sixthly, the control apparatus 10B executes self-registration information storage processing (step S106). For example, the control apparatus 10B stores the self-registration information including the IP address of the management server 20 in the self-registration information storage unit 12a of the control apparatus 10B. Seventhly, the control apparatus 10B executes individual information transmission processing (step S107). For example, the control apparatus 10B refers to the IP address of the management server 20, and transmits the individual information of the control apparatus 10B including the target identification information i(B) and the IP address of the control apparatus 10B to the management server 20. Eighthly, the management server 20 executes individual information storage processing (step S108). For example, the management server 20 receives the individual information of the control apparatus 10B transmitted from the control apparatus 10B, and stores the individual information in the individual information storage unit 23a of the control apparatus 10B.

(3-2. Flow of Certificate Management Processing)

Hereinafter, a flow of certificate management processing of the automation system 100 according to the embodiment will be described. Note that the processing in steps S201 to S212 below can be executed in a different order. In addition, there may be omitted processing among the processing of the following steps S201 to S212.

Firstly, the control apparatus 10A executes self-registration information reference processing (step S201). For example, at the time of initial setting of the control system A, the control apparatus 10A searches the self-registration information storage unit 12a of the control apparatus 10A and acquires the IP address of the management server 20. Secondly, the control apparatus 10A executes self-signed certificate generation processing (step S202), For example, the control apparatus 10A generates the self-signed certificate $C_s(A)$ including the target identification information i(A), the self-signature $S_s(A)$, and the public key $K_p(SA)$ of the control apparatus 10A. Thirdly, the control apparatus 10A executes self-signed certificate transmission processing (step S203). For example, the control apparatus 10A transmits the generated self-signed certificate $C_s(A)$ to the management server 20 on the basis of the IP address of the management server 20. Fourthly, the management server 20 executes certificate authority signature certificate generation processing (step S204). For example, the management server 20 generates the certificate authority signature certificate $C_c(A)$ including the public key $K_p(SA)$ and the certificate authority signature $S_c$. Fifthly, the management server 20 executes certificate authority signature certificate transmission processing (step S205). For example, the management server 20 transmits the generated certificate authority signature certificate $C_c(A)$ to the control apparatus 10A. Sixthly, the control apparatus 10A executes certificate authority signature certificate storage processing (step S206). For example, the control apparatus 10A stores the received certificate authority signature certificate $C_c(A)$ in the certificate authority signature certificate storage unit 12c of the control apparatus 10A.

Seventhly, the control apparatus 10B executes self-registration information reference processing (step S207). For example, at the time of initial setting of the control system B, the control apparatus 10B searches the self-registration information storage unit 12a of the control apparatus 10B to acquire the IP address of the management server 20. Eighthly, the control apparatus 10B executes self-signed certificate generation processing (step S208). For example, the control apparatus 10B generates the self-signed certificate $C_s(B)$ including the target identification information i(B), the self-signature $S_s(B)$, and the public key $K_p(SB)$ of the control apparatus 10B. Ninthly, the control apparatus 10B executes self-signed certificate transmission processing (step S209). For example, the control apparatus 10B transmits the generated self-signed certificate $C_s(B)$ to the management server 20 on the basis of the IP address of the management server 20. Tenthly, the management server 20 executes certificate authority signature certificate generation processing (step S210). For example, the management server 20 generates the certificate authority signature certificate $C_c(B)$ including the public key $K_p(SB)$ and the certificate authority signature $S_c(B)$. Eleventhly, the management server 20 executes certificate authority signature certificate transmission processing (step S211). For example, the management server 20 transmits the generated certificate authority signature certificate $C_c(B)$ to the control apparatus 10B. Twelfthly, the control apparatus 10B executes certificate authority signature certificate storage processing (step S212). For example, the control apparatus 10B stores the received certificate authority signature certificate $C_c(B)$ in the certificate authority signature certificate storage unit 12c of the control apparatus 10B.

(3-3. Flow of Data Communication Management Processing)

Hereinafter, a flow of data communication management processing of the automation system 100 according to the embodiment will be described. Note that the processing in steps S301 to S306 below can be executed in a different order. In addition, there may be omitted processing among the processing of the following steps S301 to S306.

Firstly, the control apparatus 10A executes certificate authority signature certificate reference processing (step S301). For example, when the control apparatus 10A starts data communication, the control apparatus 10A searches the certificate authority signature certificate storage unit 12c of the control apparatus 10A to acquire the certificate authority signature certificate $C_c(A)$. Secondly, the control apparatus 10A executes data communication encryption processing (step S302), For example, the control apparatus 10A generates the digest $D_d(A)$ obtained by hashing the transmission data d(A), and generates the self-signature $S_a(A)$ from the digest $D_d(A)$ using the private key $K_s(SA)$ of the control apparatus 10A. Thirdly, the control apparatus 10A executes data communication processing (step S303). For example, the control apparatus 10A transmits the transmission data d(A), the self-signature $S_a(A)$, and the certificate authority signature certificate $C_c(A)$ together with the public key $K_p(C)$ of the management server 20 to the management server 20, the another control apparatus 10A' constituting the control system A, the operator terminal of the operator who manages the control system A, and the like. On the other hand, the management server 20, the another control apparatus 10A', the operator terminal, and the like verify the presence or absence of data falsification of the public key $K_p(SA)$ and the transmission data d(A) of the control apparatus 10A using the received transmission data d(A), the self-signature $S_d(A)$, the certificate authority signature certificate $C_c(A)$, and the public key $K_p(C)$.

Fourthly, the control apparatus 10B executes certificate authority signature certificate reference processing (step S304). For example, at the start of data communication of the control apparatus 10B, the control apparatus 10B searches the certificate authority signature certificate storage unit 12c of the control apparatus 10B to acquire the certificate authority signature certificate $C_c(B)$. Fifthly, the control apparatus 10B executes data communication encryption processing (step S305). For example, the control apparatus 10B generates a digest $D_d(B)$ obtained by hashing the transmission data d(B), and generates a self-signature $S_d(B)$ from the digest $D_d(B)$ using the private key $K_s(SB)$ of the control apparatus 10B. Sixthly, the control apparatus 10B executes data communication processing (step S306). For example, the control apparatus 10B transmits the transmission data d(B), the self-signature $S_d$ (B), and the certificate authority signature certificate $C_c(B)$ together with the public key $K_p(C)$ of the management server 20 to the management server 20, another control apparatus 10B' constituting the control system B, an operator terminal of an operator who manages the control system B, and the like. On the other hand, the management server 20, the another control apparatus 10B', the operator terminal, and the like verify the presence or absence of data falsification of the public key $K_p(SB)$ and the transmission data d(B) of the control apparatus 10B using the received transmission data d(B), the self-signature $S_d(B)$, the certificate authority signature certificate $C_c(B)$, and the public key $K_p(C)$.

4. Effects of Embodiment

Finally, effects of the embodiment will be described. Hereinafter, effects 1 to 9 corresponding to the processing according to the embodiment will be described.
(4-1. Effect 1)
Firstly, in the processing according to the above-described embodiment, the control apparatus 10 transmits the self-signed certificate $C_s$ to the management server 20, receives the certificate authority signature certificate $C_c$ generated by the management server 20 according to the self-signed certificate $C_s$, and executes data communication in the control system that executes control of a system on the basis of the certificate authority signature certificate $C_c$. Thus, in this processing, it is possible to efficiently perform engineering related to the communication network of the automation system.
(4-2. Effect 2)
Secondly, in the processing according to the above-described embodiment, the control apparatus 10 transmits the self-signed certificate $C_s$ to the management server 20 using the registered IP address or host name of the management server 20, receives the certificate authority signature certificate $C_c$ generated by the management server 20 adding the certificate authority signature $S_c$ to the self-signed certificate $C_s$, and executes data communication capable of verifying falsification or capable of verifying the validity of the certificate authority signature certificate $C_c$ in the control system by using the encryption information included in the certificate authority signature certificate $C_c$. Thus, in this processing, by automatically transmitting the self-signed certificate $C_s$ to the management server 20 that manages the control system, it is possible to efficiently perform engineering related to the communication network of the automation system.
(4-3. Effect 3)
Thirdly, in the processing according to the above-described embodiment, the control apparatus 10 registers the individual information including the IP address or the host name of the control apparatus 10 in the management server 20 by using the IP address or the host name of the management server 20. Thus, in this processing, it is possible to efficiently perform engineering related to the communication network of the automation system by executing self-registration on the management server 20 that manages the control system.
(4-4. Effect 4)
Fourthly, in the process according to the above-described embodiment, the control apparatus 10 receives the certificate authority signature certificate $C_c$ generated by the management server 20 in a case where the individual information including the IP address or the host name of the control apparatus 10 is registered. Thus, in this processing, by transmitting the certificate authority signature certificate $C_c$ only to the control apparatus 10 registered in the management server 20, it is possible to efficiently perform engineering related to the communication network of the automation system.
(4-5. Effect 5)
Fifthly, in the processing according to the above-described embodiment, the control apparatus 10 transmits, when the control apparatus 10 is connected to the communication network including the management server 20 for the first time or when the control apparatus 10 is connected to the communication network after the system configuration is changed, the self-signed certificate $C_s$ to the management server 20. Thus, in the present processing, the self-signed certificate $C_s$ is automatically transmitted with the first connection or the connection after the change of the control system to the communication network as a trigger, so that it is possible to efficiently perform engineering related to the communication network of the automation system.
(4-6. Effect 6)
Sixthly, in the processing according to the above-described embodiment, the control apparatus 10 transmits the self-signed certificate $C_s$ to the management server 20 a predetermined time before the expiration date of the certificate authority signature certificate $C_c$. Thus, in this process, the engineer E automatically transmits the self-signed certificate $C_s$ without constantly checking the expiration date of the certificate authority signature certificate $C_c$, so that it is possible to efficiently perform engineering related to the communication network of the automation system.

(4-7. Effect 7)

Seventhly, in the processing according to the above-described embodiment, the control system or the control apparatus 10 conforms to OPA, MTP, or NOA. Thus, in this process, it is possible to efficiently perform engineering related to the communication network of the automation system that is being unified as the international standard.

(4-8. Effect 8)

Seventhly, in the processing according to the above-described embodiment, the control system or the control apparatus 10 conforms to OPC UA. Thus, in this process, it is possible to efficiently perform engineering related to the communication network of the automation system conforming to OPC UA.

(4-9. Effect 9)

Ninthly, in the processing according to the above-described embodiment, the control system or the control apparatus 10 executes control of the plant. Thus, in this process, it is possible to efficiently perform engineering related to the communication network of the plant automation system for which safety is required.

[System]

The processing procedure, the control procedure, the specific name, and the information including various data and parameters illustrated in the document and the drawings can be arbitrarily changed unless otherwise specified.

Further, each component of each device illustrated in the drawings is functionally conceptual, and is not necessarily physically configured as illustrated in the drawings. That is, specific forms of distribution and integration of the devices are not limited to those illustrated in the drawings. That is, all or a part thereof can be formed by being functionally or physically distributed and integrated in any unit according to various loads, usage conditions, and the like.

Furthermore, all or any part of each processing function performed in each device can be implemented by a CPU and a program analyzed and executed by the CPU, or can be implemented as hardware by wired logic.

[Hardware]

Figure 8:
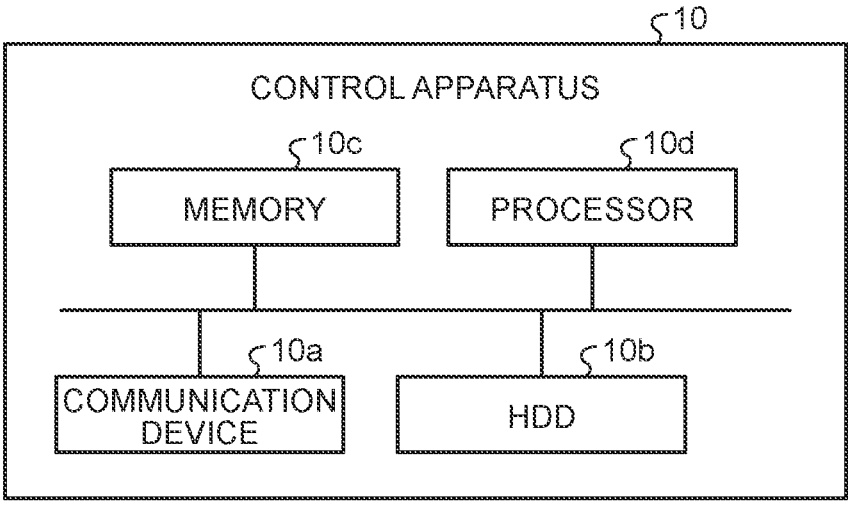
FIG. 8 is a diagram illustrating a hardware configuration example according to the embodiment.

Next, a hardware configuration example of the control apparatus 10 which is an information management device will be described. Note that other devices can have a similar hardware configuration. FIG. 8 is a diagram illustrating a hardware configuration example according to the embodiment. As illustrated in FIG. 8, the control apparatus 10 includes a communication device 10*a*, a hard disk drive (HDD) 10*b*, a memory 10*c*, and a processor 10*d*. The units illustrated in FIG. 8 are connected to each other by a bus or the like.

The communication device 10*a* is a network interface card or the like, and communicates with another server. The HDD 10*b* stores programs and databases for operating the functions illustrated in FIG. 2.

The processor 10*d* reads a program for executing processing similar to that of each processing unit illustrated in FIG. 2 from the HDD 10*b* or the like and develops the program in the memory 10*c*, thereby operating the processes for executing the functions described with reference to FIG. 2 and the like. For example, this process executes a function similar to that of each processing unit included in the control apparatus 10. Specifically, the processor 10*d* reads a program having functions similar to those of the registration unit 13*a*, the transmission unit 13*b*, the reception unit 13*c*, the execution unit 13*d*, and the like from the HDD 10*b* or the like. Then, the processor 10*d* executes a process of executing processing similar to those of the registration unit 13*a*, the transmission unit 13*b*, the reception unit 13*c*, the execution unit 13*d*, and the like.

As described above, the control apparatus 10 operates as a device that executes various processing methods by reading and executing the program. Further, the control apparatus 10 can implement functions similar to those of the above-described embodiment by reading the program from a recording medium by a medium reading device and executing the read program. Note that the program in the other embodiment is not limited to being executed by the management server 20. For example, the present invention can be similarly applied to a case where another computer or server executes a program or a case where these execute a program in cooperation.

This program can be distributed via a network such as the Internet. Further, this program is recorded on a computer-readable recording medium such as a hard disk, a flexible disk (FD), a CD-ROM, a magneto-optical disk (MO), or a digital versatile disc (DVD), and can be executed by being read from the recording medium by the computer.

OTHERS

Some examples of combinations of the disclosed technical features are described below.

(1) An information processing apparatus including: a transmission unit that transmits a self-signed certificate to a management server; a reception unit that receives a certificate authority signature certificate generated by the management server according to the self-signed certificate; and an execution unit that executes data communication in a control system that executes control of a system on the basis of the certificate authority signature certificate.

(2) The information processing apparatus according to (1), in which the transmission unit transmits the self-signed certificate to the management server using a registered Internet protocol address or host name of the management server, the reception unit receives the certificate authority signature certificate generated by the management server adding a certificate authority signature to the self-signed certificate, and the execution unit executes data communication capable of verifying falsification or capable of verifying validity of the certificate authority signature certificate in the control system by using encryption information included in the certificate authority signature certificate.

(3) The information processing apparatus according to (2), further including a registration unit that registers individual information including an Internet protocol address or a host name of the information processing apparatus in the management server by using the Internet protocol address or the host name of the management server.

(4) The information processing apparatus according to (2), in which the reception unit receives the certificate authority signature certificate generated by the management server in a case where individual information including the Internet protocol address or the host name of the information processing apparatus is registered.

(5) The information processing apparatus according to any one of (1) to (4), in which the transmission unit transmits, when the information processing apparatus is connected to a communication network including the management server for the first time or when the information processing apparatus is connected to the communication network after a system configuration is changed, the self-signed certificate to the management server.

(6) The information processing apparatus according to any one of (1) to (5), in which the transmission unit transmits the self-signed certificate to the management server a predetermined time before an expiration date of the certificate authority signature certificate.

(7) The information processing apparatus according to any one of (1) to (6), in which the control system or the information processing apparatus conforms to OPA, MTP, or NOA.

(8) The information processing apparatus according to any one of (1) to (7), in which the control system or the information processing apparatus conforms to Open Platform Communications Unified Architecture (OPC UA).

(9) The information processing apparatus according to any one of (1) to (8), in which the control system or the information processing apparatus executes control of a plant.

(10) An information processing method including, by a computer: transmitting a self-signed certificate to a management server; receiving a certificate authority signature certificate generated by the management server according to the self-signed certificate; and executing data communication in a control system that executes control of a system on the basis of the certificate authority signature certificate.

(11) A computer-readable recording medium that records an information processing program for causing a computer to execute processing of: transmitting a self-signed certificate to a management server; receiving a certificate authority signature certificate generated by the management server according to the self-signed certificate; and executing data communication in a control system that executes control of a system on the basis of the certificate authority signature certificate.

The invention claimed is:

1. A control apparatus, comprising:
a memory; and
a processor coupled to the memory, wherein the processor executes a process comprising:

transmitting, to a management server having a function of a certificate authority and having individual identification information set for a control apparatus registered therein, a self-signed certificate that is a digital certificate of the control apparatus generated using a public key and the identification information of the control apparatus, the control apparatus executing data communication in a control system of a plant including a plurality of field devices;

receiving, from the management server, a certificate authority signature certificate that is a digital certificate of the management server generated by the management server on condition that the identification information of the control apparatus that has transmitted the self-signed certificate is determined to be registered based on information obtained from the self-signed certificate; and executing data communication in the control system on the basis of the certificate authority signature certificate, wherein the transmitting transmits the self-signed certificate to the management server, when the control apparatus is connected to a communication network including the management server for the first time or when the control apparatus is connected to the communication network including the management server after a system configuration of a system to which the control apparatus belongs is changed, and the executing executes data communication that is encrypted using encryption information obtained from the certificate authority signature certificate when executing the data communication in the control system after receiving the certificate authority signature certificate.

2. The control apparatus according to claim 1, wherein
the transmitting transmits the self-signed certificate to the management server using a registered Internet protocol address or host name of the management server, the receiving receives the certificate authority signature certificate generated by the management server adding a certificate authority signature to the self-signed certificate, and the executing executes data communication capable of verifying falsification or capable of verifying validity of the certificate authority signature certificate in the control system by using encryption information included in the certificate authority signature certificate.

3. The control apparatus according to claim 2, the process further comprising:

registering individual information including an Internet protocol address or a host name of the control apparatus in the management server by using the Internet protocol address or the host name of the management server.

4. The control apparatus according to claim 2, wherein
the receiving receives the certificate authority signature certificate generated by the management server in a case where individual information including the Internet protocol address or the host name of the control apparatus is registered.

5. The control apparatus according to claim 1, wherein
the transmitting transmits the self-signed certificate to the management server a predetermined time before an expiration date of the certificate authority signature certificate.

6. The control apparatus according to claim 1, wherein
the control system or the control apparatus conforms to Open Process Automation (OPA), Module Type Package (MTP), or NAMUR Open Architecture (NOA).

7. The control apparatus according to claim 1, wherein
the control system or the control apparatus conforms to Open Platform Communications Unified Architecture (OPC UA).

8. The control apparatus according to claim 1, wherein
the control system or the control apparatus executes control of a plant.

9. A control method comprising, by a computer:
transmitting, to a management server having a function of a certificate authority and having individual identification information set for a control apparatus registered therein, a self-signed certificate that is a digital certificate of the control apparatus generated using a public key and the identification information of the control apparatus, the control apparatus executing data communication in a control system of a plant including a plurality of field devices;

receiving, from the management server, a certificate authority signature certificate that is a digital certificate of the management server generated by the management server on condition that the identification information of the control apparatus that has transmitted the self-signed certificate is determined to be registered based on information obtained from the self-signed certificate; and executing data communication in the control system on the basis of the certificate authority signature certificate, wherein the transmitting transmits the self-signed certificate to the management server, when the computer is connected to a communication network including the management server for the first time or when the computer is connected to the communication network including the management server after a system configuration of a system to which the computer belongs is changed, and the executing executes data communication that is encrypted using encryption information obtained from the certificate authority signature certificate when executing the data communication in the control system after receiving the certificate authority signature certificate.

10. A non-transitory computer-readable recording medium that records an control program for causing a computer to execute processing of:

transmitting, to a management server having a function of a certificate authority and having individual identification information set for a control apparatus registered therein, a self-signed certificate that is a digital certificate of the control apparatus generated using a public key and the identification information of the control apparatus, the control apparatus executing data communication in a control system of a plant including a plurality of field devices;

receiving, from the management server, a certificate authority signature certificate that is a digital certificate of the management server generated by the management server on condition that the identification information of the control apparatus that has transmitted the self-signed certificate is determined to be registered based on information obtained from the self-signed certificate; and executing data communication in the control system on the basis of the certificate authority signature certificate, wherein the transmitting transmits the self-signed certificate to the management server, when the computer is connected to a communication network including the management server for the first time or when the computer is connected to the communication network including the management server after a system configuration of a system to which the computer belongs is changed, and the executing executes data communication that is encrypted using encryption information obtained from the certificate authority signature certificate when executing the data communication in the control system after receiving the certificate authority signature certificate.

* * * * *